United States Patent
Mo et al.

(10) Patent No.: US 8,533,327 B2
(45) Date of Patent: Sep. 10, 2013

(54) SYSTEM AND METHOD OF PROVIDING SERVICES VIA A PEER-TO-PEER-BASED NEXT GENERATION NETWORK

(75) Inventors: Li Mo, Plano, TX (US); Weijun Lee, Plano, TX (US); Larry Shaoyan Ma, Allen, TX (US); Xing Chen, Plano, TX (US)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 485 days.

(21) Appl. No.: 12/062,404

(22) Filed: Apr. 3, 2008

(65) Prior Publication Data

US 2009/0019156 A1  Jan. 15, 2009

Related U.S. Application Data

(60) Provisional application No. 60/910,101, filed on Apr. 4, 2007.

(51) Int. Cl.
*G06F 15/16* (2006.01)
*G06F 15/173* (2006.01)

(52) U.S. Cl.
USPC ............ 709/225; 709/203; 709/217; 709/223

(58) Field of Classification Search
USPC ................ 709/201–203, 217–219, 223–226
See application file for complete search history.

(56) References Cited

U.S. PATENT DOCUMENTS

| | | | | |
|---|---|---|---|---|
| 6,332,163 B1 * | 12/2001 | Bowman-Amuah | .......... | 709/231 |
| 6,438,594 B1 * | 8/2002 | Bowman-Amuah | .......... | 709/225 |
| 6,728,267 B1 * | 4/2004 | Giese et al. | .................... | 370/469 |
| 7,310,670 B1 * | 12/2007 | Walbeck et al. | ............... | 709/225 |
| 8,250,207 B2 * | 8/2012 | Raleigh | .......................... | 709/224 |
| 2001/0044845 A1 * | 11/2001 | Cloonan et al. | ................ | 709/203 |
| 2002/0129088 A1 * | 9/2002 | Zhou et al. | ..................... | 709/200 |
| 2003/0187800 A1 * | 10/2003 | Moore et al. | ..................... | 705/52 |

(Continued)

FOREIGN PATENT DOCUMENTS

| | | |
|---|---|---|
| EP | 1 505 798 A1 | 2/2005 |
| EP | 1 718 006 A1 | 2/2006 |
| WO | WO 2006/053580 | 5/2006 |

OTHER PUBLICATIONS

Guo, Deke et al., "Moore: An Extendable Peer-to-Peer Network Based on Incomplete Kautz Digraph with Constant Degree," 2007 IEEE INFOCOM, 9 pages.

(Continued)

*Primary Examiner* — Ian N Moore
*Assistant Examiner* — Jenee Alexander
(74) *Attorney, Agent, or Firm* — Novak Druce Connolly Bove + Quigg LLP

(57) ABSTRACT

A peer-to-peer network comprises a plurality of intelligent terminal nodes, each intelligent terminal node being operable to establish, maintain, and tear-down communication sessions with another intelligent terminal node, a plurality of network service nodes coupled to the plurality of intelligent terminal nodes, the plurality of network service nodes comprise at least one of the plurality of intelligent terminal nodes, at least one user P2P function module operable to store, locate and distribute service resource information related to user policies, and at least one network P2P function module operable to store, locate and distribute service resource information related to operator provider policies, and operable to exert stricter security control than the at least one user P2P function module.

20 Claims, 7 Drawing Sheets

(56) References Cited

U.S. PATENT DOCUMENTS

| | | | |
|---|---|---|---|
| 2004/0064568 A1 | 4/2004 | Arora et al. | |
| 2004/0199768 A1* | 10/2004 | Nail | 713/169 |
| 2005/0120214 A1* | 6/2005 | Yeates et al. | 713/171 |
| 2005/0122945 A1* | 6/2005 | Hurtta | 370/338 |
| 2007/0064702 A1 | 3/2007 | Bates et al. | |
| 2008/0059579 A1* | 3/2008 | Maes | 709/204 |
| 2008/0209522 A1* | 8/2008 | Ephraim et al. | 726/4 |
| 2012/0117220 A1* | 5/2012 | Mariblanca Nieves | 709/223 |

OTHER PUBLICATIONS

Risson, John et al., "Survey of Research Towards Robust Peer-to-Peer Networks: Search Methods," Technical Report UNSW-EE-P2P-1-1, University of New South Wales, Sydney, Australia, Sep. 2004, pp. 1-36.

"Functional Requirements and Architecture of the NGN Release 1", International Telecommunication Union, Telecommunication Standardization Sector of ITU, ITU-T Recommendation Y.2012, Sep. 2006, 60 pages.

"General Overview of NGN", International Telecommunication Union, Telecommunication Standardization Sector of ITU, ITU-T Recommendation Y.2001, Dec. 2004, 18 pages.

"3GPP TS 23.206 V7.1.0 (Dec. 2006)", Global System for Mobile Communications, 3rd Generation Partnership Project, pp. 1-35.

"Telecommunications and Internet Converged Services and Protocols for Advanced Networking (TISPAN); NGN Functional Architecture Release 1", ETSI ES 282 001 V1.1.1. (Aug. 2005) ETSI Standard, pp. 1-19.

"Telecommunications and Internet Converged Services and Protocols for Advanced Networking (TISPAN); Resource and Admission Control Sub-system (RACS); Functional Architecture", ETSI ES 282 003 V1.1.1 (Jun. 2006) ETSI Standard, pp. 1-41.

"Telecommunications and Internet Converged Services and Protocols for Advanced Networking (TISPAN); NGN Functional Architecture; Network Attachment Sub-System (NASS)", ETSI ES 282 004 V1.1.1. (Jun. 2006) ETSI Standard, pp. 1-34.

"Resource and Admission Control Functions in Next Generation Networks", International Communication Union, Telecommunication Standardization Sector of ITU, ITU-T Recommendation Y.2111, Sep. 2006, 102 pages.

PCT International Searching Authority—European Patent Office, Notification of Transmittal of the International Search Report and the Written Opinion of the International Searching Authority, or the Declaration, Aug. 8, 2008, International Application No. PCT/US2008/059411, HV Rijswijk.

* cited by examiner

SYSTEM AND METHOD OF PROVIDING SERVICES VIA A PEER-TO-PEER-BASED NEXT GENERATION NETWORK

RELATED APPLICATION

This application claims the benefit of U.S. provisional patent application Ser. No. 60/910,101 filed on Apr. 4, 2007.

BACKGROUND

The fundamental principle behind Peer-to-Peer (P2P) network architectures is that the application server functions offered by the network are implemented by a large number of distributed and autonomous network nodes and end nodes called peers, which collaborate with each other to accomplish the designated tasks. This P2P arrangement is in stark contrast with the traditional client-server architecture (e.g., public switched telephone network (PSTN), IP multimedia subsystem (IMS)) in which a large number of clients communicate only with a small number of centralized, tightly managed servers responsible for performing designated tasks.

In the P2P-based network architecture, each peer provides server-like functionality and services as well as being a client within the system. In this way, the services or resources that would be provided by a centralized entity are instead available from the peers of the system.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The P2P-based next generation network (NGN) described herein supports the delivery of multimedia and communication services, and further maintains the robustness, easy-access to resources, and scalability of a traditional P2P network. The P2P-based next generation network architecture is based on the assumption that all of its participants or nodes are ephemeral in nature because the edge nodes of the network can join, leave, and fail at any time. Therefore, the network is designed to operate with minimal impact when failures occur. Further, efficient algorithms are used in the P2P-based next generation network for resource lookup such as, for example, obtaining the IP address of a subscriber. As each participant or node is responsible for central processing unit (CPU) resource and storage, the P2P-based next generation network can scale from very small to very large without any added resources from each service provider. In other words, the users are responsible for part of the capital and operational expenditures of operating the network.

With the advent of intelligent terminals that are capable of performing many application services locally without resorting to centralized network servers offered by the service provider, it is essential to identify the core values of a "service provider" network. An intelligent terminal in this context is any device that has processing power, and typically has memory, and some form of wired or wireless communication capabilities, such as desktop computers, laptop computers, palmtop computers, mobile telephones, smartphones, SIP phones, and set-top boxes.

Figure 1:
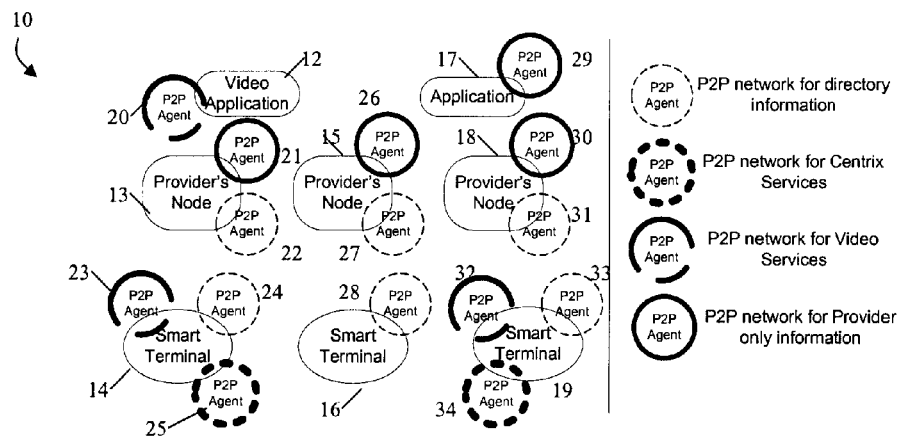
FIG. 1 is a high-level block diagram of an embodiment of the P2P-based next generation network described herein.

A high-level diagram of the P2P-based next generation network 10 is shown in FIG. 1. P2P-based next generation network 10 includes a plurality of nodes 12-19 show as video application node 12, provider's nodes 13, 15, and 18, intelligent terminals 14, 16, and 19, and an application node 17. These network nodes 12-19 are physically connected to other nodes via a variety of connection media such as copper, fiber optics, and all forms of wireless media. Upon the physical connectivity of the network nodes, there are P2P agents 20-34 "overlaid" on each node. Each P2P agent serves a specific purpose, such as providing directory information, Centrix services, video services, and providing provider-only information, for example. In the P2P-based network, the concept of "resources" is important. Everything can be considered as a "resource." For example, the current IP address of an active subscriber can be viewed as a resource, which maps the telephone number or a uniform resource identifier (URI) into the IP address. The directory of a Centrex can also be viewed as a resource, which maps the short number to an IP address. Likewise, a multimedia file can be viewed as a resource. The application server that provides certain services, e.g. file storage or billing server, can also be viewed as a resource. The strength of the P2P network is its capability to locate, distribute, and store those resources.

With intelligent terminals 14, 16, and 19, the terminals themselves locate the service or resource and invoke the service directly by connecting to them. Intelligent terminals can make the communication connection once the called party's IP address is located or identified. Another example of resources includes a fragment of an IPTV program. At the conceptual level, the intelligent terminal nodes are responsible for most of the session handling which alleviate the need to have session state in the provider's network. All the resources (e.g. subscriber's current IP address, TV fragments, file fragments, billing records, services, etc.) are distributed in the network, which encompasses all the equipment involved. Different equipment may be only responsible for different resources (e.g. subscriber's current IP address may have to be limited to be distributed inside the provider's network). Equipment in the network may contain P2P networking component (shown as P2PF in the architecture discussed later). In this setup, we utilize the key functions of the P2P network—distributing, locating, and storing files (or resources).

P2P-based next generation network 10 has, as much as possible, all or most of the intelligence in the network edge nodes or the intelligent terminals. If it is not possible to put all the intelligence into the edge nodes, then build all the intelligence into the first-hop nodes (e.g., home gateway and access points) and the edge nodes. However, if it is not possible to put all the intelligence into the edge and first-hop network nodes, then build the intelligence into the next-hop nodes (e.g. DSLAM/Edge routers) as well as the first-hop, and edge nodes. The very last choice is to put the intelligence into the servers in the core of the network (e.g. S-CSCF, Application Servers, media servers).

Figure 2:
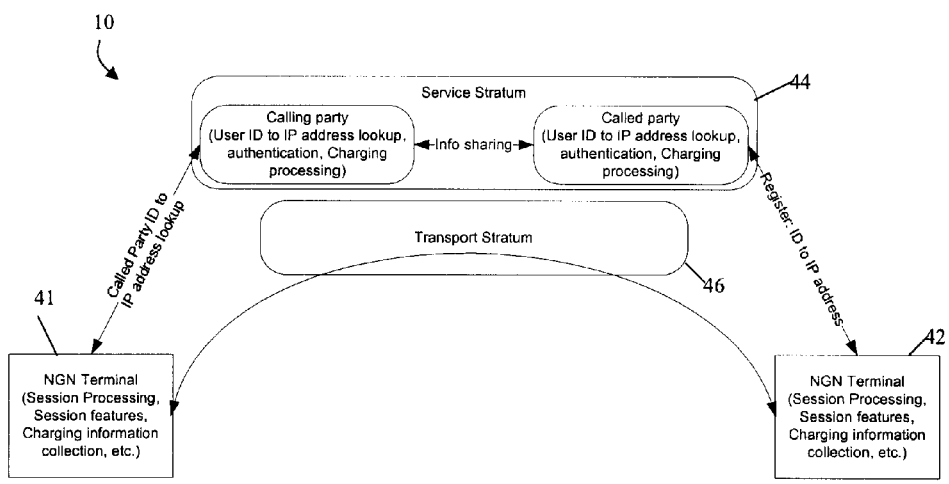
FIG. 2 is a high-level message flow diagram of an embodiment of a session setup process in the P2P-based next generation network.

FIG. 2 is a high-level message flow diagram of an embodiment of a session setup process in the P2P-based next generation network. A first intelligent terminal 40 establishes a communication session with a second intelligent terminal 42 via a service stratum 44 and a transport stratum 46 of the network. The intelligent terminals has the intelligence to perform communication session set-up, maintenance, and tear-down. Traditional value-added service features, such as session blocking, session forwarding, can also be implemented on the intelligent terminals. Other traditional value-added services, such as caller ID blocking, can be realized by service agent or relay equipment inside the network. The network may also provide default IP addresses for terminals that are not on-line for session forwarding purposes. As shown in FIG. 2, core functions of service stratum 44 includes directory lookup, authentication, charging processing, and quality of service (QoS) or resource control. For any given user ID, an IP address is provided if the user can be located, other session setup-related information can also be included in the lookup. Further, during terminal registration, the user terminal is authenticated for security considerations. The P2P-based next generation network performs the task of authenticating all the parties involved in the communication connection, such as authenticating the identities of the caller and called parties. In general, this task is not performed by the intelligent terminals because they are deemed untrustworthy. Further, while charging information is collected by the intelligent terminal, the processing of the charging information is done by service stratum 44 of the network. Additionally, the control of QoS or network transport resources is also performed by service stratum 44 of the network. The control may be segment-by-segment or end-to-end.

By pushing intelligence of the network to the edge nodes, or the terminals, service stratum 44 may eliminate the need to maintain the session state information, which improves network scalability, robustness and performance. The boundaries of service stratum 44 may not necessarily stop at the boundaries of transport stratum 46, but may reach far into the transport networks.

Figure 3:
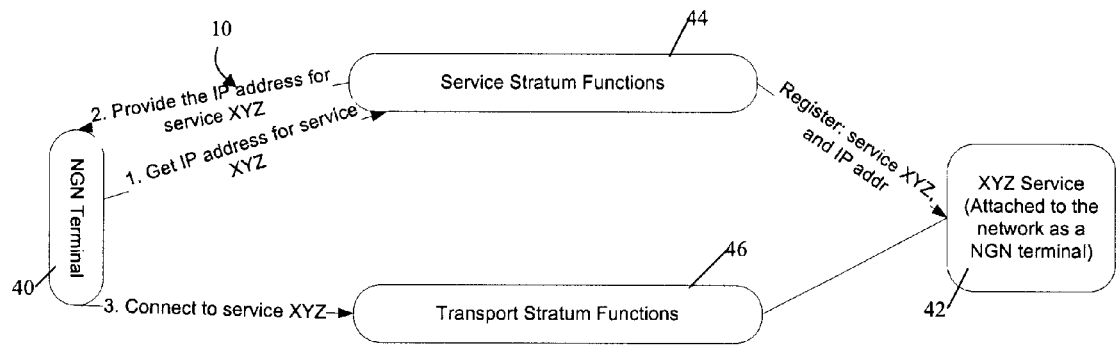
FIG. 3 is a high-level message flow diagram of an embodiment of an application provisioning process in the P2P-based next generation network.

FIG. 3 is a high-level message flow diagram of an embodiment of an application provisioning process in the P2P-based next generation network. First intelligent terminal 40 first obtains or looks up the IP address or service ID for service XYZ. The user of intelligent terminal 40 then uses the service ID to invoke or connect to the XYZ service. This user-centric model provides more flexibility of service selection and end-user experience, but also decreases the burden of service stratum 44 and potentially increases the scalability and robustness of the network.

Figure 4:
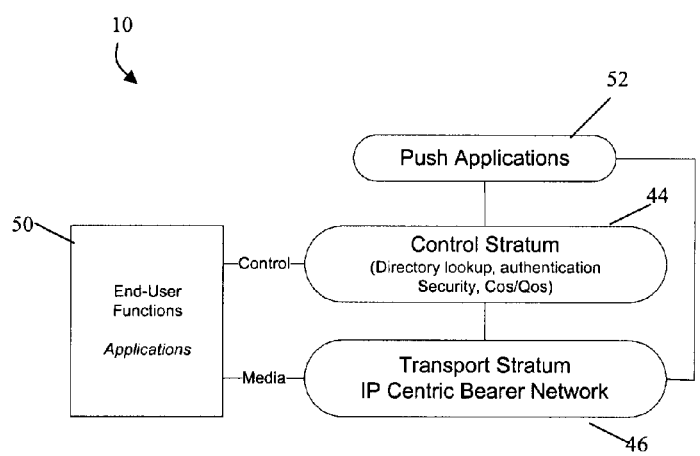
FIG. 4 is another high-level block diagram of an embodiment of the P2P-based next generation network.

FIG. 4 is another high-level block diagram of an embodiment of the P2P-based next generation network 10. Network 10 includes service stratum 44 and transport stratum 46 as described above, and further end-user functions and applications 50 as well as push applications 52. End-user applications 50 reside in the intelligent terminals and enables the functionalities described above. Further, push applications 52 in network 10 uses service and transport strata 44 and 46 to "push" or deliver content to subscribers from service providers. For example, advertisement may be pushed and inserted into media streams delivered to subscribers' intelligent terminals depending on subscription options.

Figure 5:
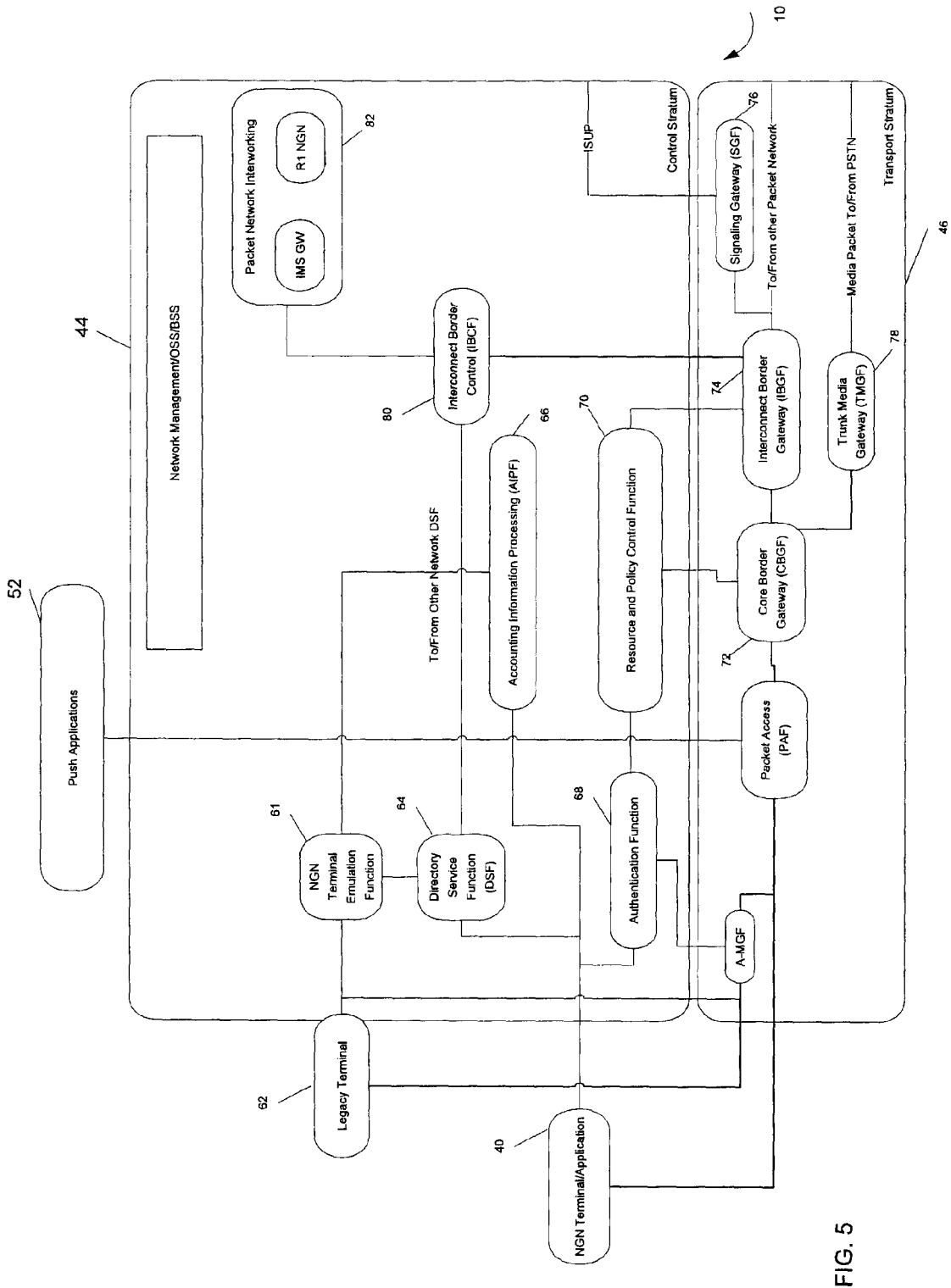
FIG. 5 is a more detailed block diagram of an embodiment of the P2P-based next generation network.

FIG. 5 is a more detailed functional block diagram of an embodiment of P2P-based next generation network 10. Service stratum 44 of network 10 includes an NGN terminal emulation function 60 to provide support to legacy terminals 62 such as dumb terminals in the network. However terminal emulation function 60 may be phased out gradually as more intelligent terminals 40 are deployed in the network and the number of legacy terminals 62 decreases. Because legacy terminal support is isolated in the network and not distributed across various network components, it is a straight forward process to phase out and eliminate this function in the network. Directory service function 64 provides the directory lookup service described above. Directory service function 64 services the terminals directly.

Directory service function 64 is operable to communicate with service provider directory lookup services for called party information if the information is not available locally. Managed VPN services can also be achieved via proper manipulation and management of the directory lookup function. Network 10 also includes accounting information processing functions 66. Accounting information processing functions 66 receive the charging information related to subscribers' communication activities from the intelligent terminals and generate an accounting statement based on the provided information. These activities may include best-effort communication sessions and sessions in which dynamic class of service (CoS) is provided. Accounting information processing functions 66 may also perform audits of data gathered and stored on the intelligent terminals to ensure the integrity of the accounting/charging information.

Authentication in network 10 may be performed by an authentication function 68, which may straddle service and transport strata 44 and 46, as shown in FIG. 5. Authentication function 68 may be similar to network attachment control functions (NACF) and/or resource and admission control functions (RACF) proposed in ITU-T Recommendation Y.2012 but modified to support mobility and different means of access mechanisms of the intelligent terminals. Authentication function 68 provides access and transport layer authentication while service authentication may or may not be bundled with access and transport authentication. Resource and policy control function 70 manages QoS for communication and permission to access certain resources similar to the RACF described in the Y.2012 Recommendations, but with modifications to cover both the mobile and fixed network environment.

Because the air interface bandwidth may be limited, all the mobile handsets can be viewed as non-P2P end-points and the network provides the necessary emulation to fit the mobile sets in the P2P network architecture. Roaming for other provider's subscriber can be supported if authentication can be performed and there is roaming agreement between those subscribers. Handovers between packet-based networks can be established by mobile IP. Handovers between circuit-based networks and P2P-based networks is can be done in a similar fashion as switching over between an IMS-based network and a circuit-based network. Nomadic users may access the "home" network services via the Internet. In this case, proper authentication mechanisms are provided to ensure security.

Transport stratum 46 of network 10 includes a number of gateway functions 72-78 to provide internetworking with existing networks. An interconnect border control function 80 is further provided in service stratum 44 as an interface to packet network internetworking functions 82.

Figure 6:
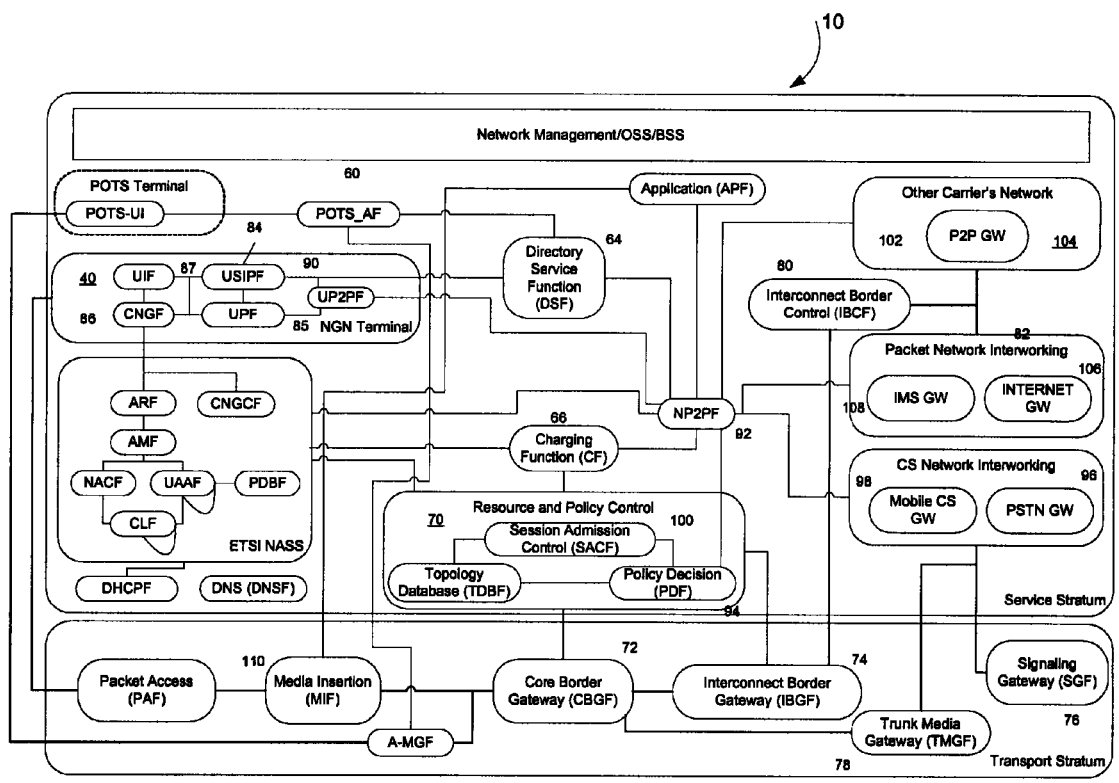
FIG. 6 is another more detailed block diagram of an embodiment of the P2P-based next generation network.

FIG. 6 is another more detailed block diagram of an embodiment of P2P-based next generation network 10. P2P-based next generation network 10 is characterized by the concept that no session state information is maintained in the network, with possible exception of the session admission control (SACF) component and POTS_AF (POTS Access Function). All the session-related information for intelligent terminals 40 are controlled by USIPF (User SIP Function) 84 and UPF (User Policy Function) 86. This simplifies network design and increases the scalability of the network. UP2 PF (User P2P Function) 90 is the component or function that stores, locates, and distributes resource information (e.g. IP addresses of a given subscriber, a fragment of IPTV program, etc) and is associated with user policy function (UPF) 85. Intelligent terminal 40 further includes a charging function 86 operable to collect all service charges, dynamic CoS charges, and session-based charges. Intelligent terminal 40 further includes a user interface function (UIF) 87 that provides a display and user input devices such as keyboard, keypad, touch-sensitive display or pad, pointing devices, for example. NP2 PF (Network P2P Function) 92 may exert stricter security control than that of UP2 PF and is associated with the operator provider's policy decision function (PDF) 94. Policy decision function 94 provides centralized policy control, which bridges the application and the subscribers. Those policies represent service provider's policy while the user personalized policy can be implemented in the intelligent terminals.

The architectural entity POTS Access Function (POTS-AF) 60 is similar or equivalent to NGN terminal emulation function 60 shown in FIG. 5. Function 60 emulates next generation network terminal function for the traditional POTS terminals. This function can be easily fulfilled by a soft switch upgraded with the P2P-related software.

The PSTN gateway (GW) function 96 provides internetworking between the P2P-based next generation network and the PSTN for the voice component of the communication sessions. Mobile circuit-switched (CS) gateway 98 provides support for inter-connectivity between the P2P-based next generation network and the current mobile circuit switched network. It may additionally provide home subscriber server (HSS) emulation for the mobile circuit switched network.

The ETSI NASS (Network Access Subsystem) 68 provides user authentication in the P2P-based next generation network. The Session Admission Control Function (SACF) 100 supports dynamic CoS and ensures QoS, described in detail below. The P2P-based next generation gateway 102 connects with other providers' P2P networks 104, which may have different P2P topology structure and different P2P search mechanisms. An Internet gateway 106 provides connectivity via the Internet where security needs to be enhanced. An IP multimedia subsystem (IMS) gateway 108 provides connectivity to an IMS for delivering Internet protocol multimedia to the users.

As described above, charging function (CF) module 66 receives charging information from the intelligent terminals, and does not maintain the intermediate state of a session. Charging information is a type of resources which can be stored, located, and distributed by the P2PF. This resource will be generated by core border gateway (CBGF) 72 or other components and send to NP2PF for storage and distribution. A plurality of charging servers can be used in the network to remove those resources once the charging information has been properly stored and processed. The items to be charged are based on operator's policy. On-line charging is possible via a proper credit system. The subscriber's credit is also a "resource" to be distributed by the NP2PF. The subscriber may replenish his/her credit for acquiring resources and services in the network.

A media insertion function (MIF) 110 is a push application that is responsible for storing, distribution, insertion or deletion of certain media content into the media stream. One example of MIF is the insertion of advertisement for the video media for certain classes of subscribers.

Figure 7:
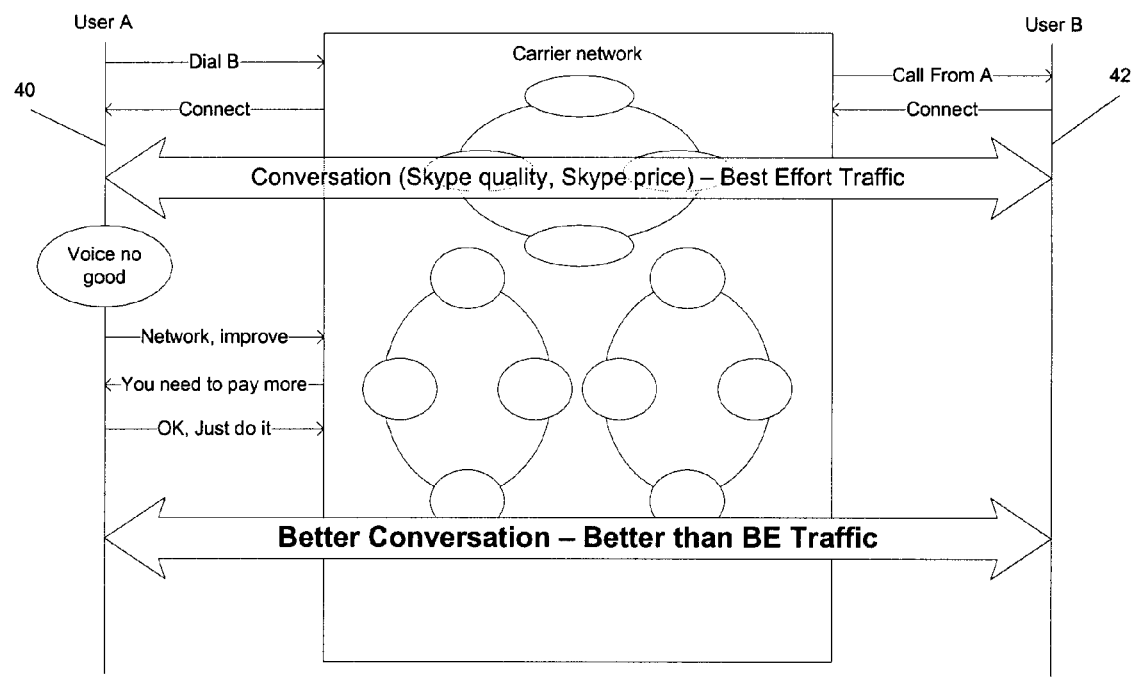
FIG. 7 is a high-level message flow diagram of an embodiment of a dynamic class of service (CoS) process in the P2P-based next generation network.

FIG. 7 is a high-level message flow diagram of an embodiment of a dynamic class of service (CoS) process in P2P-based next generation network 10. The P2P-based next generation network provides dynamic class of service (CoS) capability with monetary repercussions. For example, the caller or the called party can dynamically adjust the differentiated services code point (DSCP) in the DiffServ network, which has higher (or lower) fee associated with the connection. The user can initiate the request, which is then enforced on the network side in order to prevent CoS theft.

The subscriber has the ability to modify the CoS for both the traffic originating and terminating on the subscriber for any particular session. If the user intends to have better services, he or she request better service with the network. The network in turn will advice the new charging policy for the better service. Alternatively, the intelligent terminal may have the cost data to respond to the user's request for higher CoS directly. If the customer agrees upon the better CoS costs, the service quality (CoS) provided to the customer is improved. The intelligent terminal collects data associated with the upgrade in communication quality, such as session start time and stop time and the upgraded class, for example, for billing purposes. In order to support dynamic CoS, the subscriber or the intelligent terminal issues re-INVITE with new DSCP marking, and the response also contains the new DSCP marking. The network may snoop those SIP messages (or proxy those messages) to modify the DSCP marking, in accordance with the operator's policy and charging model.

Figure 8:
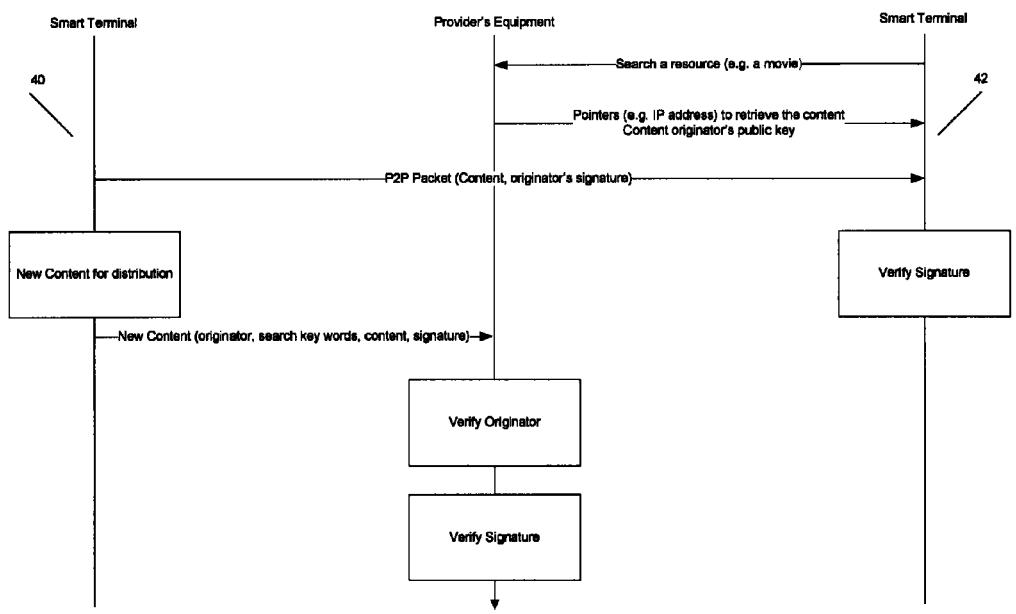
FIG. 8 is a high-level message flow diagram of an embodiment of a process to provide content security in the P2P-based next generation network.

FIG. 8 is a high-level message flow diagram of an embodiment of a process to provide content security in the P2P-based next generation network. Generally, the P2P-based next generation network described herein further extends the P2P network concept to the carriers to address the issue of security of the contents. In existing P2P-based carrier networks, the access user information is shared between users. It is therefore potentially possible to have users to use the user information for unintended purposes.

The basic assumption of a secure P2P-based next generation network is an established public key infrastructure. For any originator, its public key would be available to all the elements participating in the P2P operation. If the user's intelligent terminal does relay or originate the P2P content, the originator of the content needs to attach a digital signature using its private keys. The consumer of the P2P content needs to obtain the public key of the originator and verify the content. In this case, the originator needs to put its identification (e.g. URI) in the P2P content for verification purposes. Other mechanisms may also available to deal with the security issue but the public key infrastructure may be mature enough to be implemented. It should be noted that the subscriber to public key mapping can also be shared by the P2P network. But the originator has to be the provider's secure equipment and its public key can be obtained via any service provider's equipment (e.g. CBGF, etc).

Figure 9:
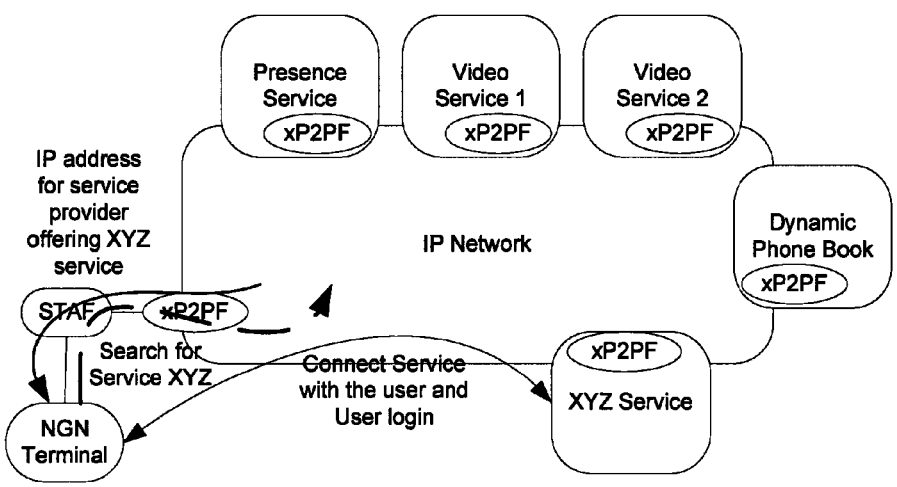
FIG. 9 is a diagram of an embodiment of a service offering environment in the P2P-based next generation network.

FIG. 9 is a diagram of an embodiment of a service offering environment in the P2P-based next generation network. One of the key strength of P2P network is its capability to provide applications, with little modification in the core network, both from the logic point of view and from the data point of view. In contrast, for IMS-based networks, the data in HSS needs to be modified for any new applications for S-CSCF triggering purposes. In the P2P based next generation network architecture, if any new services are to be provided, the new application can be connected to the existing network as shown in FIG. 9. The xP2PF indicates that the entity can be either NP2PF or UP2PF.

In this environment, the services can be added or removed with little involvement in the networking equipment, both from logic (programming) point of view and from data (data fill) point of view. The service providers can be the same as that of the access network provider, of the core network provider, or of the 3rd party.

Figure 10:
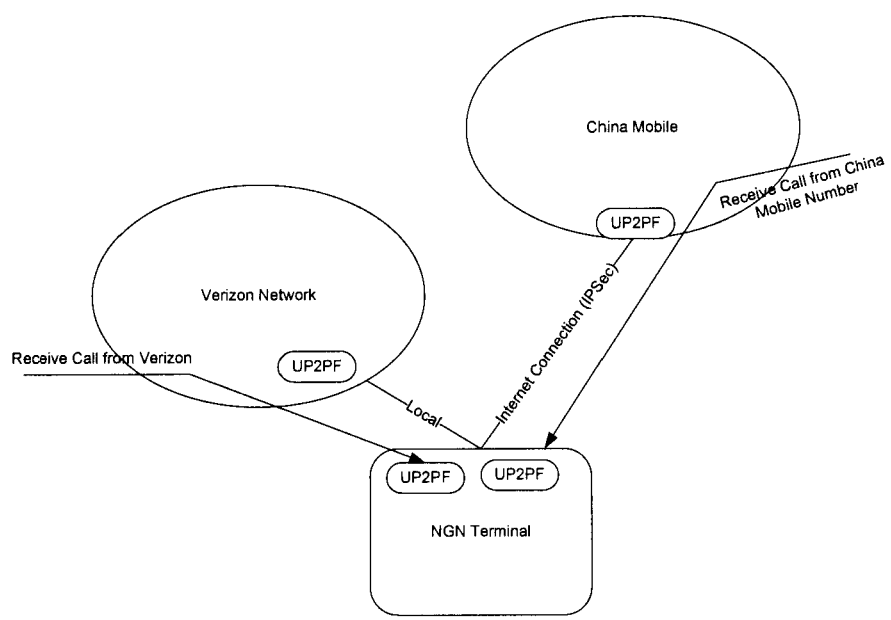
FIG. 10 is a block diagram of an embodiment of multi-registration of smart terminal nodes in the P2P-based next generation network.

FIG. 10 is a block diagram of an embodiment of multi-registration of smart terminal nodes in the P2P-based next generation network. For intelligent terminals, it is also possible to register with multiple service providers. The capability of multiple registrations on the intelligent terminal will enable diverse business model which is not possible in the current application environment. It is also enable the service provider's to extend the usage base with minimum investment.

Emergency communication in P2P-based next generation network 10 can be achieved via direct connectivity between the intelligent terminal and the public safety access point (PSAP), with its IP address can be provided via DHCP or during initial network access (e.g., authentication phase). If the PSAP is time-division multiplexed (TDM) only, the IP address of the gateway, which is responsible for the IP to TDM internetworking, will be provided. In this case, the intelligent terminal contacts the IP address (the gateway controller) directly. It is up to the operator's policy whether such address is to be provided, and if such communication is to be performed (if the gate controlled by CBGF is to open).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A peer-to-peer network comprising:
   a plurality of intelligent terminal nodes, each intelligent terminal node being configured to establish, maintain, and tear-down communication sessions directly with another intelligent terminal node, the plurality of intelligent terminal nodes comprising at least one user P2P function module configured to store, locate and distribute service resource information associated with a user policy function; and
   a plurality of network service nodes coupled to the plurality of intelligent terminal nodes, the plurality of network service nodes comprising at least one of the plurality of intelligent terminal nodes and at least one network P2P function module configured to store, locate and distribute service resource information associated with a provider policy decision function and to exert stricter security control over a communication session than the security control exerted by the at least one user P2P function module;
   wherein the plurality of intelligent terminal nodes and the plurality of network service nodes are not one or more of a session admission control component or one or more of a POTS Access Function, and the plurality of intelligent terminal nodes and the plurality of network service nodes do not maintain session state information.

2. The network of claim 1, further comprising a charging module coupled to the plurality of intelligent terminal nodes and operable to receive charging information for received services collected by the plurality of intelligent terminal nodes, and providing billing functionality for the received services.

3. The network of claim 2, wherein the charging module is operable to process costs associated with dynamic CoS service in a communication session between two intelligent terminal nodes.

4. The network of claim 1, further comprising a directory service module coupled to the plurality of intelligent terminal nodes and operable to look up and provide location of service resources to the plurality of intelligent terminal nodes.

5. The network of claim 1, further comprising an authentication module coupled to the plurality of intelligent terminal nodes and operable to authenticate an intelligent terminal node providing a service resource to another intelligent terminal node.

6. The network of claim 1, further comprising a media insertion module coupled to the plurality of intelligent terminal nodes and operable to insert media into a communication session between two intelligent terminal nodes.

7. The network of claim 1, further comprising:
   at least one dumb terminal node; and
   a terminal emulation module coupled to the at least one dumb terminal and operable to enable the at last one dumb terminal node to establish communication sessions with the plurality of intelligent terminal nodes.

8. The network of claim 1, further comprising a PSTN gateway coupled to the plurality of intelligent terminal nodes and operable to provide interface to a PSTN network.

9. The network of claim 1, further comprising a mobile circuit-switched gateway coupled to the plurality of intelligent terminal nodes and operable to provide interface to mobile circuit-switched networks.

10. The network of claim 1, further comprising an Internet gateway coupled to the plurality of intelligent terminal nodes and operable to provide interface to the Internet.

11. The network of claim 1, wherein each intelligent terminal node comprises a user SIP module and user policy module operable to control session-related information.

12. The network of claim 1, further comprising a session admission control module coupled to the plurality of intelligent terminal nodes and operable to maintain session state information.

13. The network of claim 1 further comprising a centralized policy control module coupled to the plurality of intelligent terminal nodes and operable to maintain and control provider policies.

14. A communication network comprising:
   a plurality of intelligent terminal nodes, each intelligent terminal node being configured to establish, maintain, and tear-down communication sessions with another intelligent terminal node and to collect charging information associated with the communication sessions, the plurality of intelligent terminal nodes comprising at least one user P2P function module configured to store, locate and distribute service resource information associated with a user policy function;

a network service stratum coupled to the plurality of intelligent terminal nodes and configured to locate resource services, perform billing functions, and authenticate providers of resource services in the network and to adjust a class of service of a first communication session, during the first communication session, based upon a charging policy selected by one of the intelligent terminal nodes involved in the communication session; and a network transport stratum configured to couple the plurality of intelligent terminal nodes to resource services in the network.

15. The network of claim 14, wherein the network service stratum comprises a charging module operable to process costs associated with resource services and dynamic CoS service in a communication session between two intelligent terminal nodes.

16. The network of claim 14, wherein the network service stratum comprises a directory service module coupled to the plurality of intelligent terminal nodes and operable to look up and provide location of service resources to the plurality of intelligent terminal nodes.

17. The network of claim 14, wherein the network service stratum comprises an authentication module coupled to the plurality of intelligent terminal nodes and operable to authenticate an intelligent terminal node providing a service resource to another intelligent terminal node.

18. The network of claim 14, wherein the network service stratum comprises a media insertion module coupled to the plurality of intelligent terminal nodes and operable to insert media into a communication session between two intelligent terminal nodes.

19. The network of claim 14, wherein the network service stratum comprises a terminal emulation module coupled to at least one dumb terminal in the network and operable to enable the at last one dumb terminal node to establish communication sessions with the plurality of intelligent terminal nodes.

20. A method of providing services in a peer-to-peer network, comprising:

authenticating a first intelligent terminal node as a service provider adapted to provide service;

receiving a request for an identifier of the service provider from a second intelligent terminal node of the network;

looking up the requested identifier of the first intelligent terminal node and transmitting the requested identifier to the second intelligent terminal node;

enabling the second intelligent terminal node to initiate a communication session with the first intelligent terminal node;

receiving a request, during the communication session, from the first or second intelligent terminal node to improve the quality of the communication session and enabling the requested improvement during the communication session; and receiving charging information related to charges for the communication session and the session improvement and generating billing information in response to the charging information, wherein the first and second intelligent terminal nodes comprising at least one user P2P function module configured to store, locate and distribute service resource information associated with a user policy function.

* * * * *